United States Patent [19]

Chipper

[11] Patent Number: 5,796,514
[45] Date of Patent: Aug. 18, 1998

[54] INFRARED ZOOM LENS ASSEMBLY HAVING A VARIABLE F/NUMBER

[75] Inventor: Robert B. Chipper, Allen, Tex.

[73] Assignee: Raytheon TI Systems, Inc., Lewisville, Tex.

[21] Appl. No.: 786,951

[22] Filed: Jan. 23, 1997

Related U.S. Application Data

[60] Provisional application No. 60/012,770, Mar. 4, 1996, and provisional application No. 60/012,815, Mar. 4, 1996, and provisional application No. 60/012,931, Mar. 4, 1996.

[51] Int. Cl.[6] ............................. G02B 15/14; G02B 13/14; G02B 27/44
[52] U.S. Cl. ........................ 359/354; 359/357; 359/565; 359/676
[58] Field of Search ........................ 359/353, 354, 359/357, 565–567, 676

[56] References Cited

U.S. PATENT DOCUMENTS

| | | |
|---|---|---|
| 3,825,315 | 7/1974 | Altman et al. . |
| 3,846,820 | 11/1974 | Lampe et al. . |
| 3,947,084 | 3/1976 | Noyes ........................... 359/354 |
| 4,007,978 | 2/1977 | Holton . |
| 4,018,608 | 4/1977 | Frazier . |
| 4,067,641 | 1/1978 | Holton . |
| 4,080,532 | 3/1978 | Hopper . |
| 4,084,130 | 4/1978 | Holton . |
| 4,085,550 | 4/1978 | Graham . |
| 4,142,207 | 2/1979 | McCormack et al. . |
| 4,143,269 | 3/1979 | McCormack et al. . |
| 4,162,402 | 7/1979 | Hopper . |
| 4,205,227 | 5/1980 | Reed . |
| 4,275,302 | 6/1981 | Imbert et al. . |
| 4,379,232 | 4/1983 | Hopper . |
| 4,411,488 | 10/1983 | Neil ........................... 359/354 |
| 4,411,732 | 10/1983 | Wotherspoon . |
| 4,431,917 | 2/1984 | Gibbons . |
| 4,447,291 | 5/1984 | Schulte . |
| 4,479,695 | 10/1984 | Neil ........................... 359/354 |
| 4,594,507 | 6/1986 | Elliott et al. . |
| 4,614,957 | 9/1986 | Arch et al. . |
| 4,615,595 | 10/1986 | Hornbeck . |

(List continued on next page.)

FOREIGN PATENT DOCUMENTS

| | | |
|---|---|---|
| 939943 | 1/1974 | Canada . |
| 2 251 952 | 7/1992 | United Kingdom . |
| WO 91/16607 | 10/1991 | WIPO . |

OTHER PUBLICATIONS

U.S. Pat. application Ser. No. 08/289,404, filed Aug. 12, 1994, "Durable Polomeric Optical Systems", Issuance Pending—Issue Fee Paid an Jan. 17, 1997. Now Patented, w/ PN 5,629,074 as of May 13, 1997.

*Primary Examiner*—David C. Nelms
*Assistant Examiner*—Evelyn A. Lester
*Attorney, Agent, or Firm*—Baker & Botts, L.L.P.

[57] ABSTRACT

An infrared lens assembly (16) having a variable F/Number. The infrared lens assembly (16) includes a focusing component (33), a collecting component (37), an aperture stop (46), and a diffracting component (41). The focusing component (33) may include a first and a second focusing zoom lens (34, 36) movably mounted in the infrared lens assembly (16). The focusing component (33) and the collecting component (37) may be formed from high dispersion, low index material. The aperture stop (46) may be mounted to the second focusing zoom lens (36) to vary the F/Number between a retracted zoom position and an extended zoom position. The diffracting component (41) may include a diffractive surface to correct color aberrations associated with an infrared waveband. The focusing component (33) and the collecting component (37) cooperate with the diffracting component (41) to focus infrared radiation at an image plane (15) of an infrared detector (18).

22 Claims, 2 Drawing Sheets

U.S. PATENT DOCUMENTS

| | | |
|---|---|---|
| 4,621,888 | 11/1986 | Crossland et al. . |
| 4,639,759 | 1/1987 | Rosbeck et al. . |
| 4,659,171 | 4/1987 | Neil ........................................... 359/354 |
| 4,676,581 | 6/1987 | Roberts ...................................... 359/354 |
| 4,684,812 | 8/1987 | Tew et al. . |
| 4,705,361 | 11/1987 | Frazier et al. . |
| 4,710,732 | 12/1987 | Hornbeck . |
| 4,751,387 | 6/1988 | Robillard . |
| 4,802,717 | 2/1989 | Kebo .......................................... 359/354 |
| 4,877,317 | 10/1989 | Gibbons et al. . |
| 4,948,976 | 8/1990 | Baliga et al. . |
| 4,956,619 | 9/1990 | Hornbeck . |
| 4,965,649 | 10/1990 | Zanio et al. . |
| 4,994,672 | 2/1991 | Cross et al. . |
| 5,010,251 | 4/1991 | Grinberg et al. . |
| 5,021,663 | 6/1991 | Hornbeck . |
| 5,022,724 | 6/1991 | Shechterman ............................. 359/354 |
| 5,044,706 | 9/1991 | Chen .......................................... 359/357 |
| 5,047,644 | 9/1991 | Meissner et al. . |
| 5,051,591 | 9/1991 | Trotta et al. . |
| 5,061,049 | 10/1991 | Hornbeck . |
| 5,083,857 | 1/1992 | Hornbeck . |
| 5,113,076 | 5/1992 | Schulte . |
| 5,132,848 | 7/1992 | Nishio et al. . |
| 5,144,138 | 9/1992 | Kinch et al. . |
| 5,188,970 | 2/1993 | York et al. . |
| 5,196,703 | 3/1993 | Keenan . |
| 5,229,880 | 7/1993 | Spencer et al. ............................ 359/357 |
| 5,238,530 | 8/1993 | Douglas et al. . |
| 5,264,326 | 11/1993 | Meissner et al. . |
| 5,268,790 | 12/1993 | Chen .......................................... 359/565 |
| 5,313,331 | 5/1994 | Mihara . |
| 5,346,532 | 9/1994 | Sinclair et al. . |
| 5,424,869 | 6/1995 | Nanjo . |
| 5,446,581 | 8/1995 | Jamieson ................................... 359/357 |
| 5,493,441 | 2/1996 | Chipper . |
| 5,559,332 | 9/1996 | Meissner et al. . |

INFRARED ZOOM LENS ASSEMBLY HAVING A VARIABLE F/NUMBER

RELATED APPLICATIONS

This application is related to copending U.S. patent application Ser. No. 08/181,263 filed Jan. 13, 1994 entitled "INFRARED CONTINUOUS ZOOM TELESCOPE USING DIFFRACTIVE OPTICS" now U.S. Pat. No. 5,493,441; copending U.S. Provisional application Ser. No. 60/012,931 filed Mar. 4, 1996 entitled "DUAL BAND INFRARED LENS ASSEMBLY USING DIFFRACTIVE OPTICS"; copending U.S. Provisional application Ser. No. 60/012,770 filed Mar. 4, 1996 entitled "DUAL PURPOSE INFRARED LENS ASSEMBLY USING DIFFRACTIVE OPTICS"; and copending U.S. Provisional application Ser. No. 60/012,815 filed Mar. 4, 1996 entitled "WIDE FIELD OF VIEW INFRARED ZOOM LENS ASSEMBLY HAVING A CONSTANT F/NUMBER".

TECHNICAL FIELD OF THE INVENTION

This invention relates generally to optical systems, and more particularly to an infrared zoom lens assembly having a variable F/Number.

BACKGROUND OF THE INVENTION

Infrared or thermal imaging systems typically use a plurality of thermal sensors to detect infrared radiation and produce an image capable of being visualized by the human eye. Thermal imaging systems typically detect thermal radiance differences between various objects in a scene and display these differences in thermal radiance as a visual image of the scene. Thermal imaging systems are often used to detect fires, overheating machinery, planes, vehicles and people, and to control temperature sensitive industrial processes.

The basic components of a thermal imaging system generally include optics for collecting and focusing infrared radiation from a scene, an infrared detector having a plurality of thermal sensors for converting infrared radiation to an electrical signal, and electronics for amplifying and processing the electrical signal into a visual display or for storage in an appropriate medium. A chopper is often included in a thermal imaging system to modulate the infrared radiation and to produce a constant background radiance which provides a reference signal. The electronic processing portion of the thermal imagining system will subtract the reference signal from the total radiance signal to produce a signal with minimum background bias.

Thermal imaging systems may use a variety of infrared detectors. An infrared detector is a device that responds to electromagnetic radiation in the infrared spectrum. Infrared detectors are sometimes classified into two main categories as cooled and uncooled. A cooled infrared detector is an infrared detector that must be operated at cryogenic temperatures, such at the temperature of liquid nitrogen, to obtain the desired sensitivity to variations in infrared radiation. Cooled detectors typically employ thermal sensors having small bandgap semiconductors that generate a change in voltage due to photoelectron interaction. This latter effect is sometimes called the internal photoelectric effect.

Uncooled infrared detectors cannot make use of small bandgap semiconductors because dark current swamps any signal at room temperature. Consequently, uncooled detectors rely on other physical phenomenon and are less sensitive than cooled detectors. However, because uncooled detectors do not require the energy consumption of cooled detectors, they are the preferred choice for portable, low power, applications where the greater sensitivity of cooled detectors is not needed. In a typical uncooled thermal detector, infrared photons are absorbed and the resulting temperature difference of the absorbing element is detected. Thermal detectors include a pyroelectric detector, a thermocouple, or a bolometer.

An infrared window is a frequency region in the infrared spectrum where there is good transmission of electromagnetic radiation through the atmosphere. Typically, infrared detectors sense infrared radiation in the spectral bands from 3 to 5 microns (having an energy of 0.4 to 0.25 eV) and from 8 to 14 microns (having an energy of 0.16 to 0.09 eV). The 3 to 5 micron spectral band is generally termed the "near infrared band" while the 8 to 14 micron spectral band is termed the "far infrared band." Infrared radiation between the near and far infrared bands cannot normally be detected due to atmospheric absorption of the same.

Infrared radiation is generally focused onto a thermal detector by one or more infrared lens. Infrared lens assemblies may be classified as single field of view or zoom. A zoom lens may employ a fixed or a variable aperture stop. A variable aperture stop allows a infrared zoom lens to vary the F/Number, and thus the sensitivity, over the zoom range. Infrared zoom lenses having a variable F/Number, however, are typically expensive to manufacture due to the number and size of lens elements and to the materials needed to construct the lens.

SUMMARY OF THE INVENTION

In accordance with the present invention, an infrared zoom lens assembly having a variable F/Number is provided that substantially eliminates or reduces the disadvantages and problems associated with prior infrared detection systems.

In accordance with the present invention, an infrared lens assembly is provided with a plurality of components located along an optical axis to focus infrared radiation of an object. A focusing component includes a first focusing zoom lens and a second focusing zoom lens. The focusing zoom lenses may be formed of a high dispersion, low index material and movably mounted in the infrared lens assembly. A collecting component includes at least one collecting lens that may also be formed of high dispersion, low index material. An aperture stop may be movably mounted along the optical axis. A diffracting component includes at least one diffractive surface that may be employed to correct color aberrations associated with an infrared waveband. The focusing and collecting components cooperate with the diffractive component to focus infrared radiation of the object onto an image plane of an associated infrared detector.

More specifically, the second focusing zoom lens may be located along the optical axis between the first focusing zoom lens and the collecting component. In this embodiment, the aperture stop may be mounted to the second focusing zoom lens.

In accordance with another aspect of the present invention, a diffractive lens incorporating the diffractive surface may be removably mounted in the infrared lens assembly. To reduce costs, the diffractive lens may be formed from an inexpensive polymer. The high dispersion, low index material of the focusing and collecting lenses may be chalcogenide glass or other material having infrared transmitting properties that change minimally between the near and far infrared wavebands.

Important technical advantages of the present invention include providing a relatively low cost infrared zoom lens assembly having a variable F/Number, and thus a variable sensitivity, over the zoom range. In particular, the location of the aperture stop minimizes the diameter of the zoom focusing lenses and allows the lens assembly to have a variable F/Number. Thus, the present invention eliminates the cost associated with large focusing zoom lenses for variable F/Number applications.

Another important technical advantage of the present invention includes providing an infrared zoom lens assembly operable in the near and far infrared wavebands. Thus, separate infrared zoom lens assemblies need not be designed and fabricated for use in the near and far infrared wavebands.

Other technical advantages will be readily apparent to one skilled in the art from the following figures, descriptions, and claims.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION OF THE INVENTION

Figure 1:
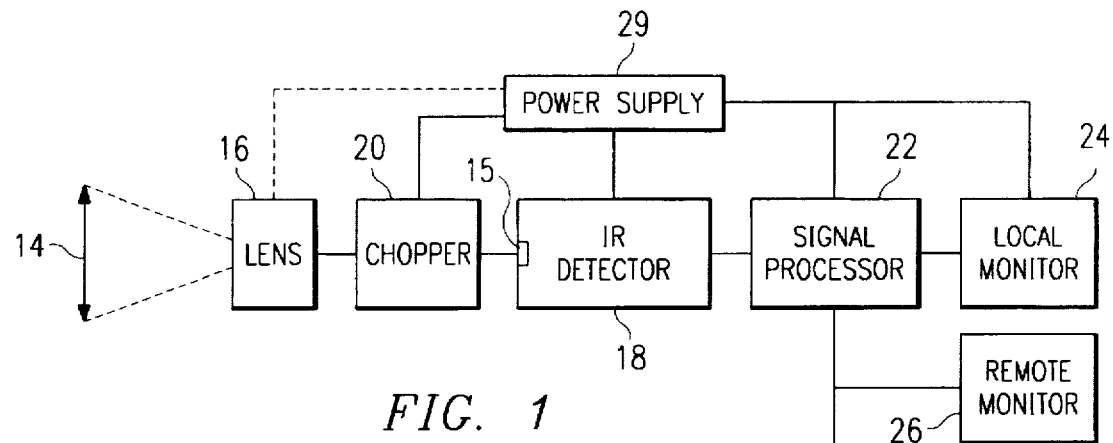
FIG. 1 is a block diagram of an infrared imaging system with an infrared zoom lens assembly having a variable F/Number in accordance with the present invention.

The preferred embodiments of the present invention and its advantages are best understood by referring to FIGS. 1 through 3 of the drawings, in which like numerals refer to like parts throughout the several views. FIG. 1 shows a schematic block diagram of an infrared imaging system 12 for detecting, processing, and displaying the heat image of an object 14. The infrared imaging system 12 may be used to detect fires, overheating machinery, planes, vehicles and people, and to control temperature sensitive industrial processes.

As shown by FIG. 1, the infrared imaging system 12 comprises a zoom lens assembly 16 in optical communication with an infrared detector 18. The infrared detector 18 senses infrared radiation, typically, in the spectral bands from 3 to 5 microns (having an energy of 0.4 to 0.25 eV) and from 8 to 14 microns (having an energy of 0.16 to 0.09 eV). The 3 to 5 micron spectral band is generally termed the "near infrared band" while the 8 to 14 micron spectral band is termed the "far infrared band." Infrared radiation between the near and far infrared bands cannot normally be detected due to atmospheric absorption.

The zoom lens assembly 16 focuses or directs infrared radiation emitted by the object 14 onto an image plane iS of the infrared detector 18. In cases where an uncooled detector 18 is used, a chopper 20 is often disposed between the zoom lens assembly 16 and the infrared detector 18. The chopper 20 may be controlled by a signal processor 22 to periodically interrupt transmission of the infrared image to the image plane 15 of the infrared detector 18. The chopper 20 may be a rotating disk with openings that periodically block and let pass infrared radiation.

The infrared detector 18 translates incoming infrared radiation into one or more images and corresponding electrical signals for processing. Electrical signals are fed to the signal processor 22, which assembles electrical signals into video signals for display. As previously described, the signal processor 22 may also synchronize operation of the chopper 20. This synchronization enables the signal processor 22 to subtractively process incoming infrared radiation to eliminate both fixed infrared background radiation and time constant noise. The output of the signal processor 22 is often a video signal that may be viewed, further process, stored, or the like.

The video signal may be viewed on a local monitor 24 or fed to a remote monitor 26 for display. The local monitor 24 may be an eye piece containing an electronic viewfinder, a cathode ray tube, or the like. Similarly, the remote monitor 26 may comprise an electronic display, a cathode ray tube, such as a television, or other type of device capable of displaying the video signal. The video signal may also be saved to a storage medium 28 for later recall. The storage medium 28 may be a compact disk, a hard disk drive, random access memory, or any other type of medium capable of storing electronic video signals for later recall. Monitors and storage mediums are well known in the art and therefore will not be further described herein.

Electrical power to operate the infrared imaging system 12 may be provided by a power supply 29. The power supply 29 provides electrical power directly to the chopper 20, the infrared detector 18, the signal processor 22, and to the local monitor 24. Electrical power may also be provided to the zoom lens assembly 16, when, for example, a motor is employed to zoom the lens assembly 16.

Figure 2A:
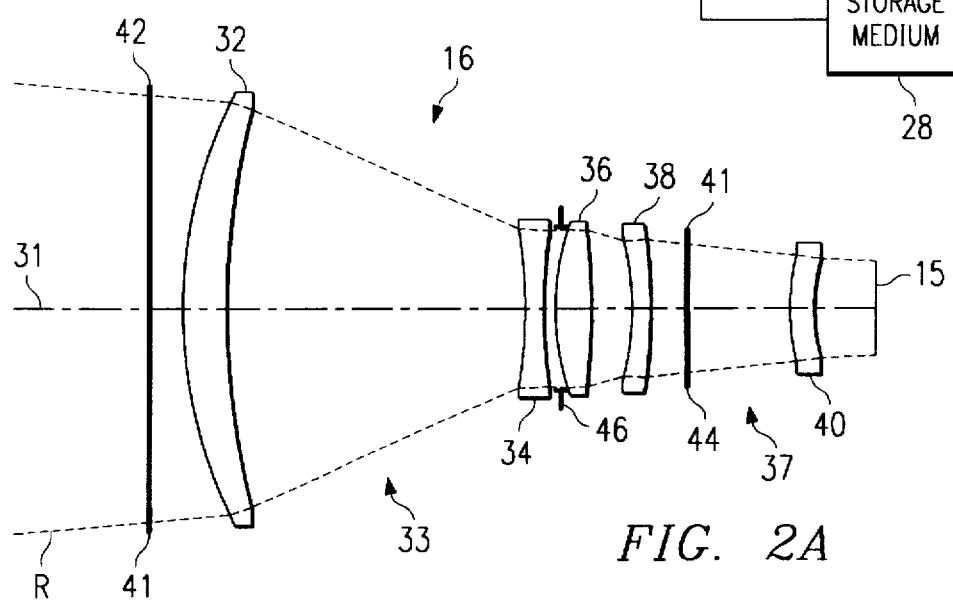
FIGS. 2A-B are schematic drawings of the infrared zoom lens assembly of FIG. 1.
Figure 2B:
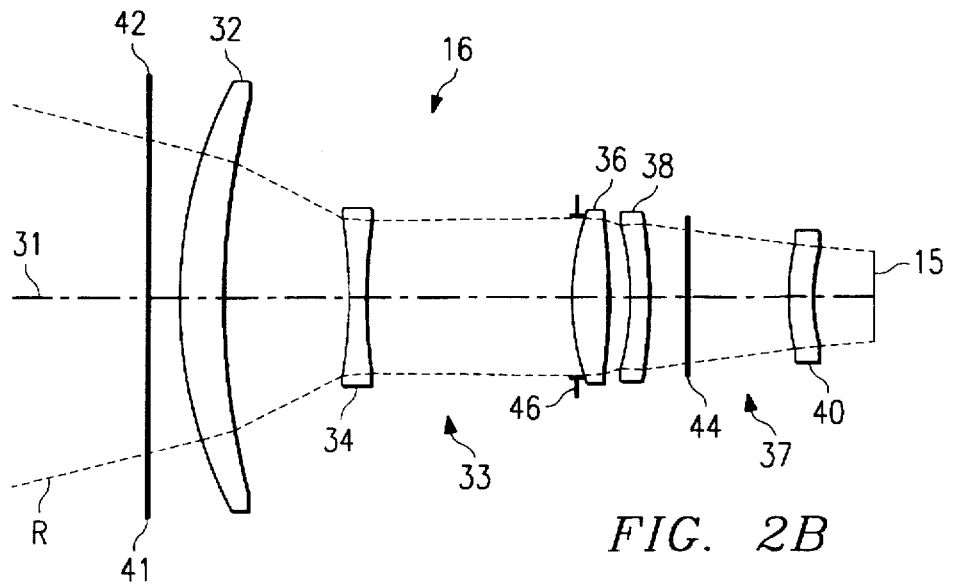
Figure 3A:
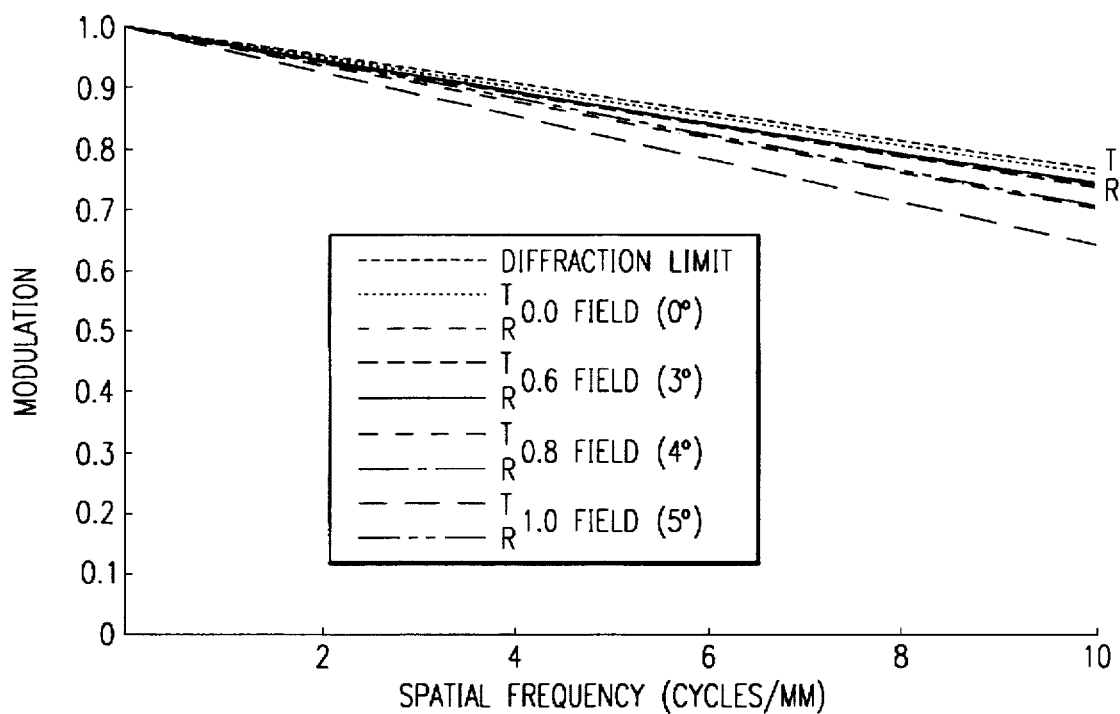
FIGS. 3A-B are frequency drawings of the infrared zoom lens assembly of FIGS. 2A-B, showing modulation transfer function performance of the lens, which is a measure of contrast, versus spatial frequency.
Figure 3B:
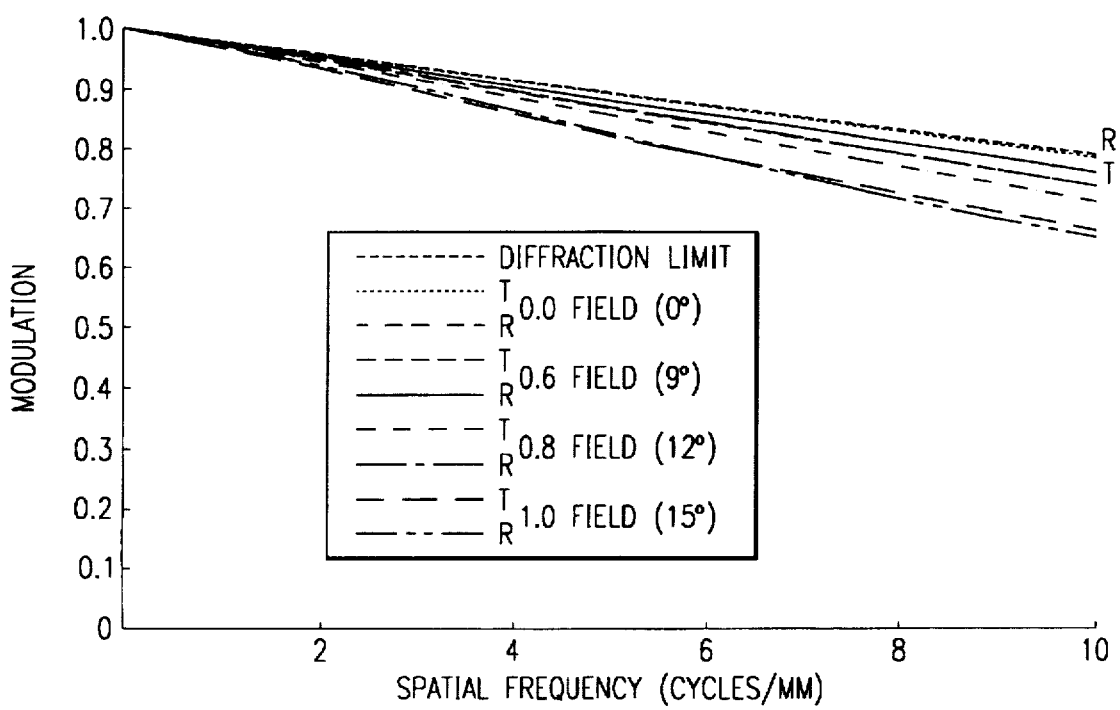

FIGS. 2A-B are schematic drawings of the zoom lens assembly 16 incorporating an embodiment of the present invention. In this embodiment, zoom lens assembly 16 may be generally described as a zoom lens having a retracted position shown in FIG. 2A and an extended position shown in FIG. 2B. Preferably, zoom lens assembly 16 is approximately 50 millimeters in overall length and operable over a horizontal field of view of eight to twenty-four degrees (8°–24°) and yielding a 3:1 zoom ratio with a 4:3 aspect ratio. If desired, the operable horizontal field of view may be six to eighteen degrees (6°–18°). Graphs of the performance of the zoom lens assembly 16 verses spacial frequency are shown for the retracted zoom position in FIG. 3A and for the extended zoom position in FIG. 3B.

As shown by FIGS. 2A-B, the various components of zoom lens assembly 16 are positioned along an optical axis 31. Zoom lens assembly 16 comprises a focusing component 33 including a fixed objective lens 32 and a pair of moveable zoom lenses 34 and 36. A collecting component 37 includes a pair of fixed collecting lenses 38 and 40. A diffracting component 41 includes a pair of diffractive lenses 42 and 44.

In accordance with conventional practice, the radius of curvature of the lens elements will be defined as positive if the center of curvature lies to the right of the lens element and will be defined as negative if the center of curvature lies to the left of the lens element along optical axis 31. A lens element will be defined as converging if the lens focussing power causes parallel light rays to converge, and will be defined as diverging if the lens focussing power causes parallel light rays to appear to originate from a virtual focus.

Further, a side of a lens will be defined as a first side if facing the object 14 and defined as a second side if facing the image plane 15.

For the embodiment of FIGS. 2A–B, objective lens 32 is a positive converging lens. Focusing zoom lens 34 is a negative diverging lens while focusing zoom lens 36 is a positive converging lens. Focusing zoom lenses 34 and 36 move relative to each other in a nonlinear fashion. As best shown by comparison of FIGS. 2A–B, as lens assembly 16 is zoomed, focusing zoom lens 34 moves toward the objective lens 32 while focusing zoom lens 36 moves in the opposite direction toward the collecting lens 38. Collecting lens 38 is a negative diverging lens while collecting lens 40 is a positive converging lens. Objective lens 32, zoom lenses 34 and 36, and collecting lenses 38 and 40 cooperate with diffractive lenses 42 and 44, which are discussed below in detail, to focus infrared radiation emitted by object 14 onto the image plane 15 of the infrared detector 18. Preferably, infrared detector 18 is an uncooled detector for use in connection with zoom lens assembly 16.

An aperture stop 46 may be mounted on a first side of zoom focusing lens 36. The aperture stop 46 determines the diameter of the cone of energy that the zoom lens assembly 16 will accept by limiting the passage of infrared energy through the lens. The cone of energy that the zoom lens assembly 16 will accept is shown by ray trace R.

The aperture stop 46 moves with zoom focusing lens 36, causing the F/Number of the lens assembly 16 to vary over the zoom range. This allows greater sensitivity in the wider fields of view. Also, the variable F/Number allows the diameter of the zoom focusing lenses to be minimized. For the embodiment shown in FIGS. 2A–B, the F/Number changes from approximately 1.8 to 1.6 through the zoom range.

The focusing zoom lenses 34 and 36 and the collecting lenses 38 and 40 may be constructed of a single material having infrared transmitting properties that change minimally between the near and far infrared wavebands. This construction will allow the zoom lens assembly 16 to be used in both the near and the far infrared wavebands.

The material may be a glass or a similar type of infrared transmitting material having a high dispersion rate and a low refractive index. The refractive index of a material is the ratio of the speed of light in a vacuum (essentially the same as in air) to the speed of light in the material. The dispersion rate of a material is the rate of change of the refractive index of the material with respect to a wavelength. The dispersion rate may be expressed as an Abbe V-number, which is a measure of the reciprocal relative dispersion. Thus, a high dispersion rate corresponds to a low Abbe V-number and visa-versa. As used herein, the phrase "low refractive index" means a refractive index of less than 3.3. The phrase "high dispersion rate," as used herein, means an Abbe V-number of less than 200.

Materials having a high dispersion rate and a low refractive index include Gallium Arsenide (GaAs) and chalcogenide glass, such as TI 1173 manufactured by Texas Instruments Incorporated. Germanium, which is often the preferred material for far infrared lenses, has a low dispersion rate in the far infrared band and a high refractive index. Germanium is preferred in other infrared lens applications because lenses having a high refractive index need less curvature than lenses with a low refractive index. Thus, use of a high index material makes it is easier to correct for image aberrations such as spherical, coma, and astigmatism.

The properties of TI 1173, Gallium Arsenide, and Germanium in the near and far infrared bands are listed below in Table 1. In Table 1, the Abbe V-number is a measure of the reciprocal relative dispersion of the material.

TABLE 1

| Material | INDEX | | ABBE V-NUMBER | |
| | 10 Micron | 4 Micron | Far Infrared Band | Near Infrared Band |
| --- | --- | --- | --- | --- |
| TI1173 | 2.604 | 2.622 | 108 | 169 |
| GaAs | 3.278 | 3.307 | 108 | 146 |
| Ge | 4.003 | 4.025 | 991 | 102 |

From Table 1, for a high dispersion, low index material such as TI 1173, the properties change very little between the near and far infrared wavebands. Accordingly, zoom lens assembly 16 is equally applicable to the near and far infrared bands.

As previously discussed, low index materials, such as TI 1173, have a reduced capacity to bend light. To compensate, the lens elements of zoom lens assembly 16 have larger curvatures than would otherwise be used. Consequently, it may be more difficult to reduce image degrading aberrations, such as spherical, coma, and astigmatism. To reduce such image degrading aberrations, focusing zoom lenses 34 and 36 and collecting lenses 38 and 40 include aspheric surfaces. The general equation for an aspheric surface is:

$$Z = \frac{(CC)Y^2}{1 + [1 - (1 + K)(CC)^2 Y^2]^{1/2}} + AY^4 + BY^6 + CY^8 + DY^{10}$$

where:

Z is Sag value along the z-axis;

Y is the semi-diameter height;

CC is the base curvature (1/radius) of the surface;

K is the conic coefficient; and

A, B, C and D are the 4th, 6th, 8th and 10th order aspheric coefficients, respectively.

The coefficients of the aspheric surfaces of objective lens 32, focusing zoom lenses 34 and 36, and collecting lenses 38 and 40 are listed below in Table 2.

TABLE 2

Aspheric Surface Coefficients

| Parameter | | Objective Lens 32 | Zoom Lens 34 | Zoom Lens 36 | Collecting Lens 38 | Collecting Lens 40 |
|---|---|---|---|---|---|---|
| Curavture (CC) | | | | | | |
| Surface 1 | | .245896 | -.199723 | .409816 | -.460186 | .588706 |
| Surface 2 | | .144771 | .252865 | -.243529 | -.197103 | .528905 |
| Aspheric Coefficients | | | | | | |
| K | S1 | 0 | 0 | 0 | 0 | 0 |
| A4 | S1 | .411608E-3 | -.250980E-1 | -.201602E-1 | .404900E-2 | -.199389E+0 |
| A6 | S1 | .500232E-4 | .121343E-1 | -.432337E-2 | -.615887E-1 | -.833622E+0 |
| A8 | S1 | .578246E-5 | -.201663E-1 | .183462E-1 | -.189339E+0 | -.129475E+1 |
| A10 | S1 | -.322169E-5 | .406960E-1 | -.134667E+0 | .374545E+0 | .121452E+1 |
| K | S2 | 0 | 0 | 0 | 0 | 0 |
| A4 | S2 | .388929E-3 | -.347576E-1 | .205264E-1 | -.622066E-1 | -.121649E+0 |
| A6 | S2 | .101269E-5 | .160838E-1 | -.337104E-2 | -.747590E-1 | -.907138E+0 |
| A8 | S2 | .120523E-4 | -.285738E-1 | .146100E-1 | -.914724E-1 | -.295348E+1 |
| A10 | S2 | -.424785E-5 | .479984E-1 | .153432E+0 | .259541E+0 | .865478E+1 |

The aspheric surfaces of the lens elements may be formed by press molding or by grinding operations. Further information concerning molding of the lens elements is disclosed by commonly assigned U.S. Pat. No. 5,346,523, entitled "METHOD OF MOLDING CHALCOGENIDE GLASS LENSES." Shaping of lenses is well known in the art and therefore will not be further described.

A chalcogenide glass, such as TI 1173, generally has a low DN/DT (delta refractive index/delta temperature) value, which is the rate of change of a material's refractive index with changes in temperature. If a chalcogenide glass or other material having a low DN/DT value is used to construct the lens elements, zoom lens assembly 16 may be passively athermalized. That is, constructed to hold focus with changes in temperature without aid of a motor or similar device.

Zoom lens assembly 16 may be passively athermalized by mounting collecting lens 40 against a plastic spacer (not shown). The spacer expands and contracts with temperature changes in relation to the change of the refractive index of the lens elements. Thus, as the temperature changes, and the refractive index of the lens elements change, the spacer expands or contracts to position the collecting lens 40 to where it accounts for the change in refractive index of the lens elements.

Diffractive lenses 42 and 44 each comprise an infrared transmitting material having a diffractive surface. The diffractive surface may be a kinoform produced by diamond point turning, patterned and etched, or the like. Kinoforms are diffractive elements whose phase modulation is introduced by a surface relief pattern. The diffractive optical surface results in a step function whose surface is cut back by precisely one wavelength of the light frequency of interest, preferably 4 microns for the near infrared band and 10 microns for the far infrared band, every time their thickness increases by that amount. The general equation for a diffractive surface is:

$$Z = \frac{(CC)*Y^2}{1+SQRT[1-(1+K)(CC)^2Y^2]} + AY^4 + BY^6 + CY^8 + DY^{10} +$$

$$|HOR|*\left(\frac{C1Y^2+C2Y^4+C3Y^6}{(N1-N2)}-\right.$$

-continued $$\left.\frac{\lambda}{N1-N2}*INT\frac{|C1Y^2+C2Y^4+C3Y^6|}{\lambda}\right)$$

where:
Z is Sag value along the Z-axis or optical axis;
Y is the semi-diameter height;
CC is the base curvature (1/radius) of the surface;
K is the conic coefficient of surface;
A, B, C, and D are the 4th, 6th, 8th and 10th order aspheric coefficients, respectively;
HOR is the diffraction order, generally 1 or −1;
λ is the design wavelength for surface;
N1 is the Refractive index of material preceding diffractive surface;
N2 is the Refractive index of material following diffractive surface; and
C1, C2, and C3 are coefficients for describing aspheric phase departure.

The diffractive kinoform surfaces coefficients of diffractive lenses 42 and 44 are listed below in Table 3.

TABLE 3

DIFFRACTIVE KINOFORM SURFACE COEFFICIENTS

| Parameter | Diffractive Lens 42 | Diffractive Lens 44 |
|---|---|---|
| HOR | −1 | −1 |
| λ (inches) | 4 e-4 | 4 e-4 |
| N1 | 1.5 | 1.5 |
| N-2 | 1.0 | 1.0 |
| CC (inches) | 0 | 0 |
| K | 0 | 0 |
| A | 0 | 0 |
| B | 0 | 0 |
| C | 0 | 0 |
| D | 0 | 0 |
| C1 | 1.9563E-03 | 1.0474E-02 |
| C2 | 0 | 0 |
| C3 | 0 | 0 |

Further information concerning kinoform diffractive surfaces is disclosed by commonly assigned U.S. patent application Ser. No. 08/181,263, filed Jan. 13, 1994, and entitled "INFRARED CONTINUOUS ZOOM TELESCOPE USING DIFFRACTIVE OPTICS," which is hereby incorporated by reference.

As shown by FIGS. 2A–B, diffractive lens 42 may be positioned in front of the object lens 32 to control axial color. Specifically, diffractive lens 42 may correct axial color focusing aberrations. The diffractive surface may be formed on a second side of the diffractive lens 42 facing the object lens 32. In such a case, the first side of the diffractive lens 42 may be used as a protective window to prevent dust and other elements from entering zoom lens assembly 16.

Diffractive lens 44 may be positioned between collecting lenses 38 and 40 to control lateral color. Specifically, diffractive lens 44 may correct lateral color focusing aberrations. Both diffractive lenses 42 and 44 are fixed in position. To keep the cost of the zoom lens assembly 16 down, diffractive lenses 42 and 44 are preferably constructed of an inexpensive polymer material such as that described in commonly assigned U.S. patent application Ser. No. 08/289, 404 filed Aug. 12, 1994, which is hereby incorporated by reference.

Although lens assembly 16 includes two diffractive surfaces for color correction, it will be understood by those skilled in the art that a single diffractive surface may be used in accordance with the present invention. A single diffractive surface, however, may not correct color aberrations as well as the pair of diffractive surfaces employed by zoom lens assembly 16. Additionally, although the diffractive surfaces are formed as separate lenses in zoom lens assembly 16, it will be understood by those skilled in the art that the diffractive surface can be formed on a second side of a lens element. For example, the diffractive surface of diffractive lens 42 could be formed instead on a second side of objective lens 32, thus eliminating the need for the separate diffractive lens 42.

Diffractive lenses 42 and 44 are designed to correct color in the near infrared waveband or in the far infrared waveband. As previously described, the light frequency of interest by which the diffractive surface is cut by one wavelength is 4 microns for the near infrared band. The light frequency of interest for the far infrared waveband is 10 microns. Accordingly, diffractive lenses 42 and 44 may be removably mounted in the zoom lens assembly 16 so they may be removed and replaced with diffractive lenses for a different infrared waveband. Thus, lens assembly 16 can be switched between the near and far infrared wavebands by simply exchanging diffractive lenses 42 and 44, which are inexpensive and easy to exchange. The critical and expensive objective lens 32, focusing zoom lenses 34 and 36, and collecting lenses 38 and 40 need not be altered between infrared wavebands. Therefore, in accordance with the present invention, a single type of infrared lens can be designed and fabricated for use in both the near and far infrared bands.

If desired, alternate diffractive lenses for the near and far infrared bands can be selectably mounted on a filter wheel for diffractive lenses 42 and 44. In this configuration, the dual band lens can be combined with a dual band detector to form a dual band infrared imager system that can be switched between the near and far infrared bands to better perceive a heat source under prevailing conditions.

Though the present invention and its advantages have been described in detail, it should be understood that various changes, substitutions and alterations can be made herein without departing from the spirit and scope of the invention as defined by the appended claims.

What is claimed is:

1. An infrared zoom lens assembly, comprising:
   a focusing component located along an optical axis to receive infrared radiation, the focusing component comprising a first and a second focusing zoom lens formed from a high dispersion, low index material;
   a collecting component located along the optical axis in optical communication with the focusing component, the collecting component comprising at least one collecting lens formed from the high dispersion, low index material;
   an aperture stop movably mounted along the optical axis;
   a diffracting component located along the optical axis and in optical communication with the focusing and collecting components, the diffracting component comprising at least one diffractive surface to correct color aberrations associated with an infrared waveband; and
   the focusing and collecting components cooperating with the diffracting component to focus infrared radiation at an image plane of an infrared detector.

2. The infrared zoom lens assembly of claim 1, further comprising the second focusing zoom lens located along the optical axis between the first focusing zoom lens and the collecting component, the aperture stop mounted to the second focusing zoom lens.

3. The infrared zoom lens assembly of claim 1, further comprising the aperture stop operable to vary the F/Number of said zoom lens assembly from about 1.6 to about 1.8 between a retracted and an extended zoom position.

4. The infrared zoom lens assembly of claim 1, the focusing and collecting lenses further comprising aspheric surfaces.

5. The infrared zoom lens assembly of claim 1, the high dispersion, low index material further comprising an index less than 3.3 and an Abbe V-number less than 200.

6. The infrared zoom lens assembly of claim 1, the high dispersion, low index material further comprising chalcogenide glass.

7. The infrared zoom lens assembly of claim 1, the high dispersion, low index material further comprising TI 1173 glass.

8. The infrared zoom lens assembly of claim 1, the diffracting component further comprising a diffractive lens removably mounted in said lens assembly, the diffractive lens incorporating the diffractive surface.

9. The infrared zoom lens assembly of claim 8, further comprising the diffractive lens formed from a polymer.

10. The infrared zoom lens assembly of claim 1, the diffracting component further comprising:
    the diffractive surface located along the optical axis proximate to the focusing component;
    a second diffracting surface to correct color aberrations associated with the infrared waveband; and
    the second diffractive surface located along the optical axis proximate to the collecting component.

11. The infrared zoom lens assembly of claim 10, the diffracting component further comprising:
    a diffractive lens removably mounted in said infrared zoom lens assembly, the diffractive lens incorporating the diffractive surface; and
    a second diffractive lens removably mounted in said infrared zoom lens assembly, the second diffractive lens incorporating the second diffractive surface.

12. The infrared zoom lens assembly of claim 1, further comprising said infrared zoom lens assembly being passively athermalized.

13. The infrared zoom lens assembly of claim 1, further comprising a spacer mounting the collecting lens, the spacer operable to expand and contract with temperature changes in relation to a change of a refractive index of said zoom lens assembly.

14. An infrared imaging system operative in the near and far infrared wavebands, comprising:

an infrared detector operative in the near and far infrared wavebands, the infrared detector including an image plane located along an optical axis; and an infrared zoom lens assembly operative in the near and far infrared wavebands, the infrared lens assembly in optical communication with the infrared detector and comprising:

a focusing component located along the optical axis to receive infrared radiation, the focusing component comprising a first and a second focusing zoom lens formed from a high dispersion, low index material;

a collecting component located along the optical axis in optical communication with the focusing component, the collecting component comprising at least one collecting lens formed from the high dispersion, low index material;

an aperture stop movably mounted along the optical axis;

a diffracting component located along the optical axis and in optical communication with the focusing and collecting components, the diffracting component comprising at least one diffractive surface to correct color aberrations associated with an infrared waveband; and the focusing and collecting components cooperating with the diffracting component to focus infrared radiation at the image plane of the infrared detector.

15. The infrared imaging system of claim 14, further comprising the second focusing zoom lens located along the optical axis between the first focusing zoom lens and the collecting component, the aperture stop mounted to the second focusing zoom lens.

16. The infrared imaging system of claim 14, further comprising the aperture stop operable to vary the F/Number of said infrared lens assembly from about 1.6 to about 1.8 between a retracted and an extended zoom position.

17. The infrared imaging system of claim 14, the focusing and collecting lenses further comprising aspheric surfaces.

18. The infrared imaging system of claim 14, the high dispersion, low index material further comprising an index less than 3.3 and an Abbe V-number less than 200.

19. The infrared imaging system of claim 14, the high dispersion, low index material further comprising chalcogenide glass.

20. The infrared imaging system of claim 14, the high dispersion, low index material further comprising TI 1173 glass.

21. The infrared imaging system of claim 14, the diffracting component further comprising a diffractive lens removably mounted in said infrared lens assembly, the diffractive lens incorporating the diffractive surface.

22. The infrared imaging system of claim 14, the diffracting component further comprising:

the diffractive surface located along the optical axis proximate to the focusing component;

a second diffracting surface to correct color aberrations associated with the infrared waveband; and the second diffractive surface located along the optical axis proximate to the collecting component.

* * * * *